Patented Nov. 13, 1945

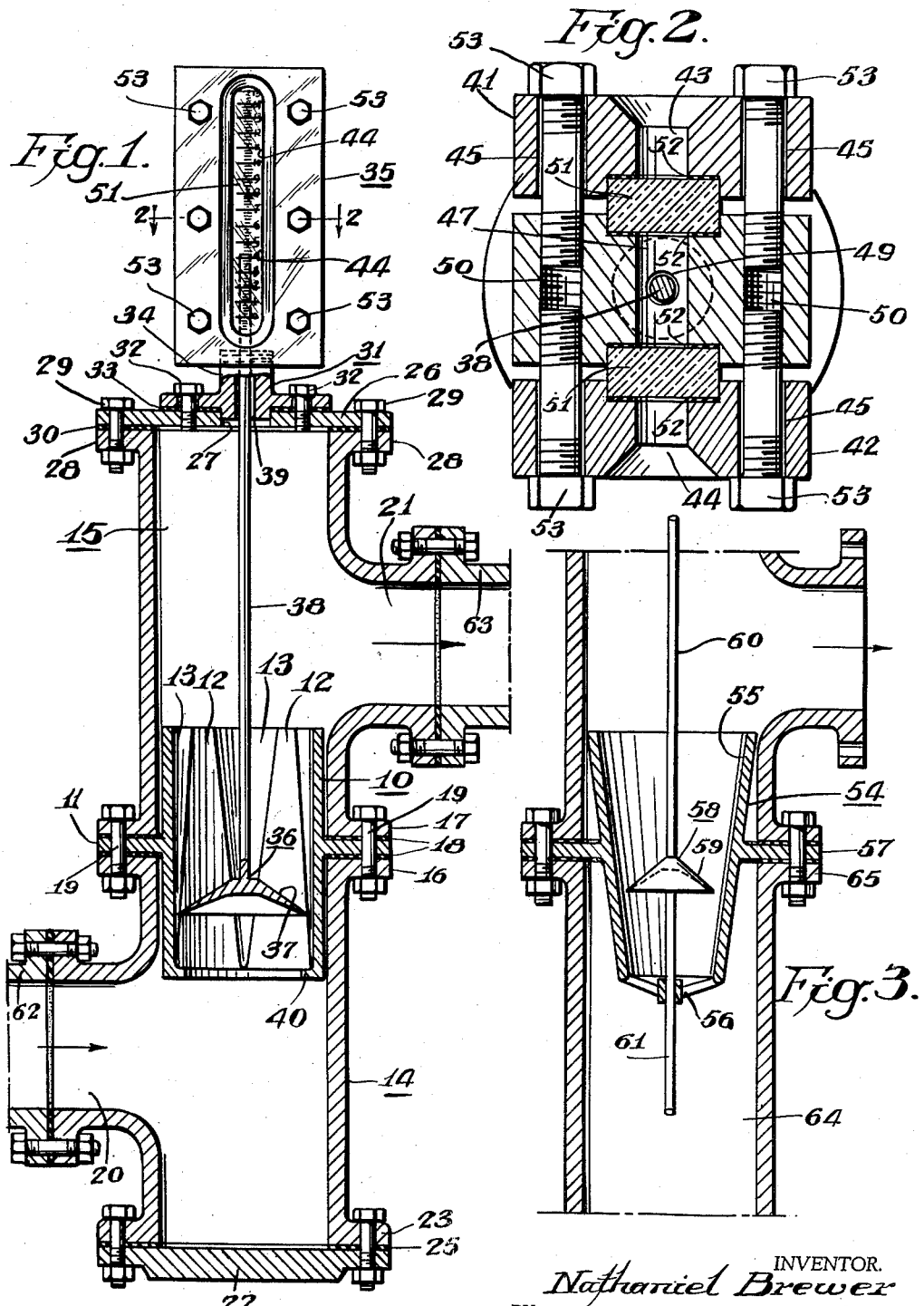

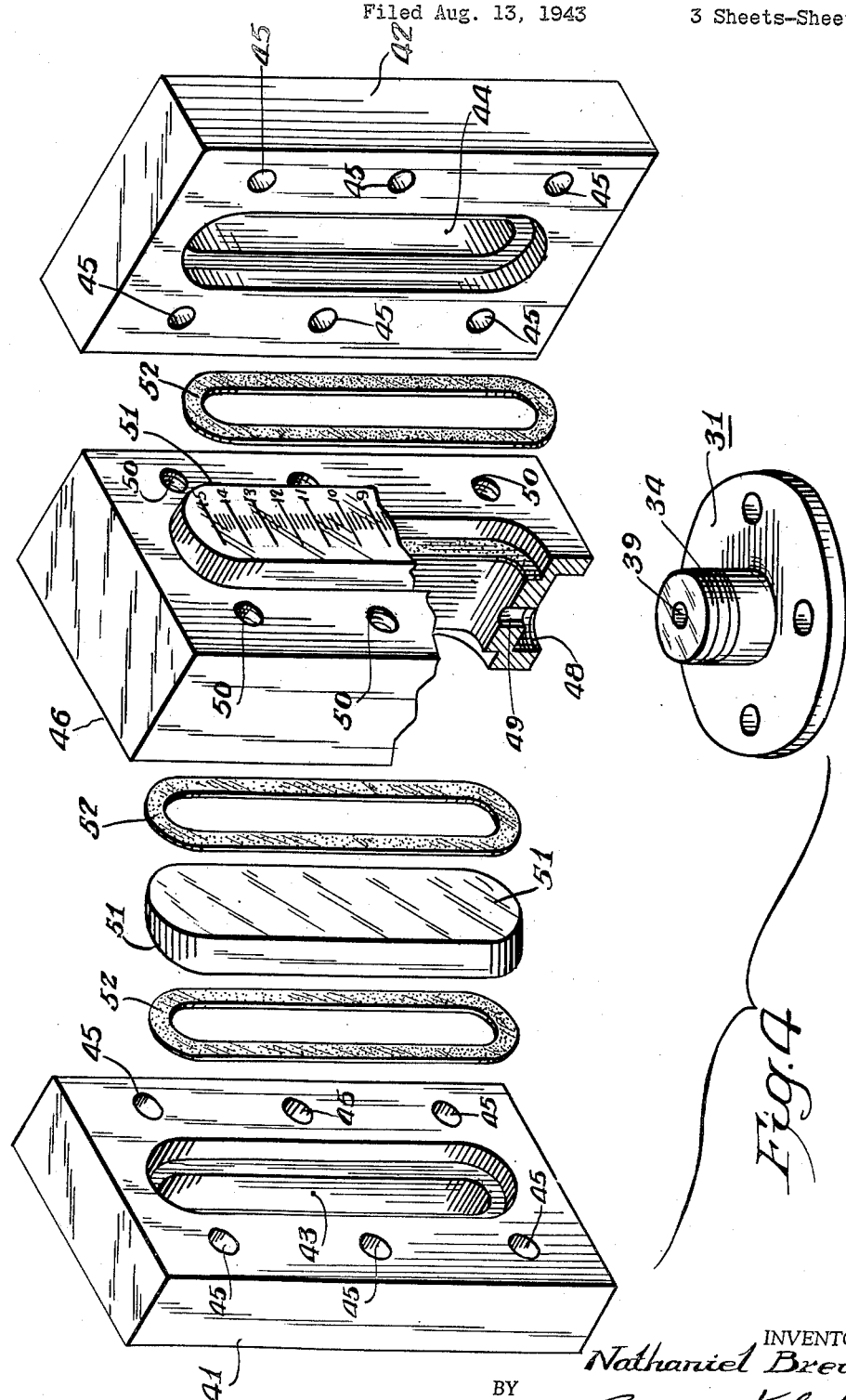

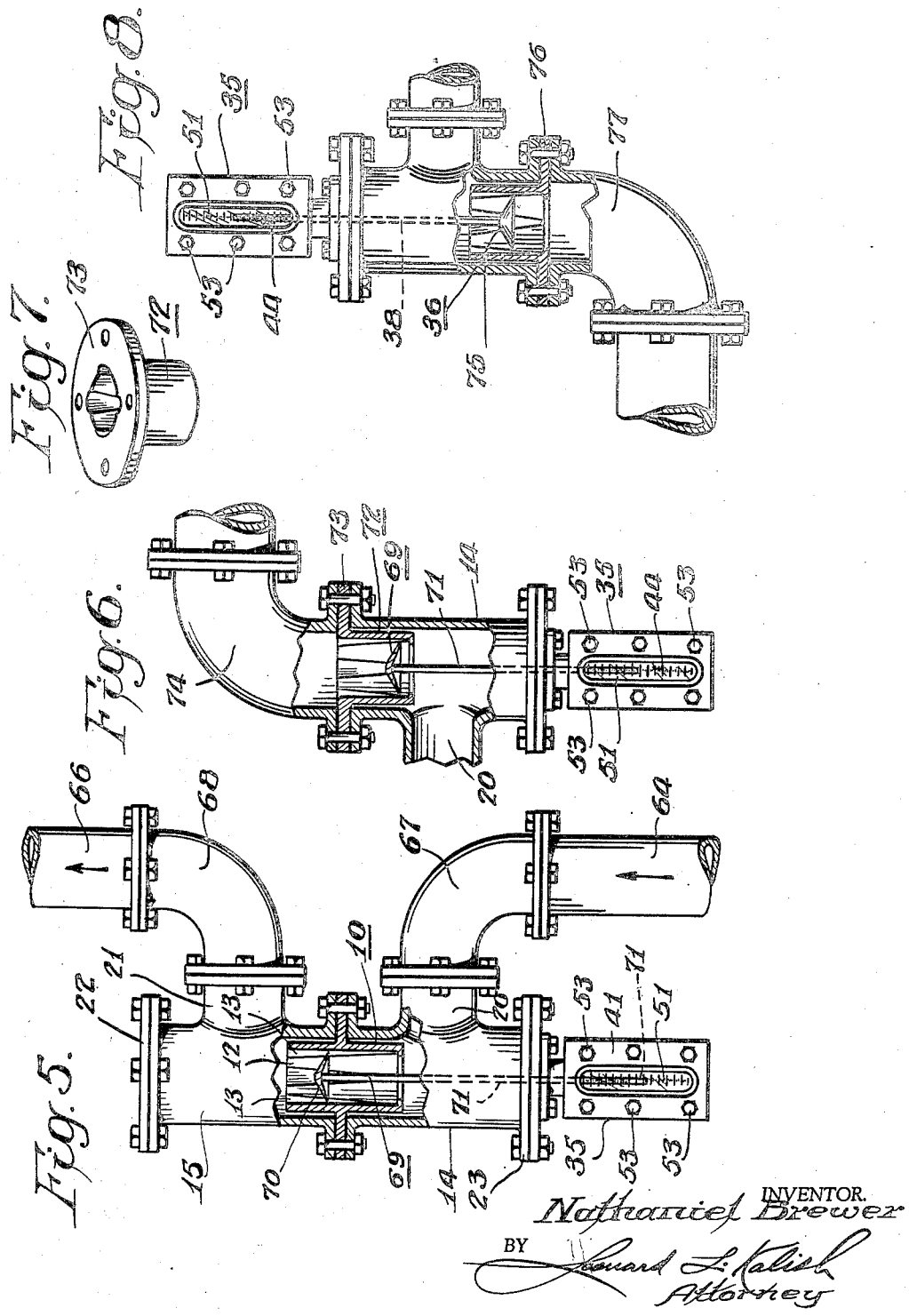

2,388,672

UNITED STATES PATENT OFFICE 2,388,672

FLOW MEASURING DEVICE

Nathaniel Brewer, Hatfield, Pa., assignor to Fischer & Porter Company, Hatboro, Pa., a corporation of Pennsylvania Application August 13, 1943, Serial No. 498,443

15 Claims. (Cl. 73—209)

The present invention relates to measurement of rate-of-flow of fluid and it relates more particularly to certain new and useful means for accurately and inexpensively determining rate-of-flow of fluid through pipe-lines or the like.

An object of the present invention is to provide inexpensive, accurate and easily assembled means for determining the rate-of-flow of a fluid through a pipe line or the like. Another object of the present invention is to provide a flow-rate instrument of the character generally known as rotameter which is inexpensive and accurate and which can be quickly and easily installed in a pipe-line or the like by connecting it intermediate ordinary standard pipe sections or fittings.

Other objects and advantages of the present invention are apparent in the following detailed description, appended claims and accompanying drawings.

For the purpose of illustrating the invention, there are shown in the accompanying drawings forms thereof which are at present preferred, since the same having been found in practice to give satisfactory and reliable results, although it is understood that the various instrumentalities of which the invention consists can be variously arranged and organized and that the invention is not limited to the precise arrangements and organizations of the instrumentalities as herein shown and described.

Referring to the accompanying drawings in which like reference characters indicate like parts throughout:

Figure 1 represents a vertical cross-sectional view of one embodiment of the present invention.

Figure 2 represents a horizontal cross-sectional view generally along the line 2—2 Figure 1.

Figure 3 represents a fragmentary vertical cross-sectional view of another embodiment of the present invention.

Figure 4 represents a perspective view, on an enlarged scale, of the component parts making up the visual extension of Figure 1, as they appear when dis-assembled—parts being broken away better to reveal the construction thereof.

Figure 5 represents a side elevational view of another embodiment of the present invention; parts being broken away better to reveal the construction thereof.

Figure 6 represents a vertical cross-sectional view with parts in elevation of another embodiment of the present invention in which the metering tube insert is disposed wholly within a single pipe-line element.

Figure 7 represents a perspective view of the metering tube insert of Figure 6.

Figure 8 represents a vertical cross-sectional view with parts in elevation of a modified form of the embodiment of Figure 6.

In the embodiment of Figures 1, 2, and 4, I have shown a rotameter which can be installed quickly and easily within a pipe-line or the like by connecting a flanged metering tube element intermediate the ends of two standard flanged T pipe fittings and by providing a visual extension connected to the upper T for reading the position of the metering float.

The metering tube 10 of Figure 1, is an elongated generally cylindrical sleeve-like member having an annular outwardly-extending flange 11.

The metering tube 10, which may be of metal or any other suitable material, has a generally cylindrical inner bore 12 upon which are formed a plurality of circumferentially-spaced, generally axially-extending flutes 13. The flutes 13 have a generally uniform radial depth and increase upwardly in transverse or circumferential dimension so as to give a uniform-depth by-pass of upwardly-increasing cross-sectional area for the metering float to be hereinafter described. This fluted meter surface is the subject of my co-pending application Serial No. 484,711, filed April 27, 1943.

The flanged metering tube 10 is adapted to be inserted within lower and upper standard pipe T's 14 and 15, respectively.

That is, the metering tube 10 is disposed within the vertically-disposed straight arms of the T's, with the flange 11 of the metering tube 10 intermediate the upper flange 16 of the lower T 14 and the lower flange 17 of the upper T 15; suitable gaskets 18 being provided intermediate the flanges 11 and 16 and 11 and 17.

The flanges 11, 16, and 17 are provided with suitable apertures through which bolts 19 connect the assembly and maintain fluid-tight relationship there-between.

The side opening 20 of the lower T 14 serves as the inlet opening of the rotameter and is adapted for connection to a horizontal inlet pipe-line 62. Similarly, the side opening 21 of the upper T 15 serves as the outlet opening of the rotameter and is adapted for connection to a horizontal outlet pipe-line 63.

The lower end of the lower T 14 may be closed off by means of a cover plate 22 which is connected in fluid-tight relationship to the lower flange 23 of said T 14 by means of bolts and an intermediate gasket 25.

An adaptor plate 26 having a central opening 27 therein is connected to the top flange 28 of the upper T 15 by means of bolts 29 and an intervening gasket 30.

A flanged plug 31 is held in fluid-tight relationship within the opening 27 of the adaptor plate 26 by means of bolts 32 and an intervening gasket 33.

The plug 31 is provided with an upwardly-extending externally screw-threaded neck 34 to which is connected a visual extension 35 to be described in detail hereinafter.

A metering float 36, which is the subject of copending application Serial No. 409,048 of Kermit Fischer, filed August 30, 1941, is provided for the rotameter tube 10. The metering float 36 includes a tapered or dished downwardly-opening flow-constricting head portion 37, which generally resembles an opened umbrella and which has a transverse dimension slightly smaller than the diameter of the cylindrical inner bore 12 of the metering tube 10. Extending upwardly from the head portion 37, is a relatively thin elongated body portion or extension 38.

The extension 38 extends upwardly through the central opening 39 of the plug 31 and, as is evident from Figure 1, the position of the upper end of the extension 38 within the visual extension 35 indicates the position of the flow-constricting head 37 within the metering tube 10.

The position of the head 37 of the metering float 36 within the metering tube 10 is determined by the rate-of-flow of the fluid upwardly through said tube.

The metering float 36 is somewhat greater in density than the fluid to be metered so that, when there is now flow of fluid, the float is in its lowermost position in which the head 37 rests against an inwardly-extending annular flange 40 formed at the bottom of the tube 10. As is well known in the art, the metering float will rise within the metering tube when fluid starts flowing upwardly therethrough; the greater the rate-of-flow the higher the position of the metering float and vice versa.

As shown particularly in Figures 2 and 4, the extension 35 is made up of a pair of outer plates 41 and 42 of metal or the like having sight openings 43 and 44 therethrough.

The plates 41 and 42 each have a plurality of aligned bolt openings 45 therethrough along the edges thereof.

A central plate 46 of metal or the like is provided intermediate the outer plates 41 and 42; the plate 46 having a central opening 47 therein coinciding with the sight openings 43 and 44 in the outer plates 41 and 42.

An externally screw-threaded socket 48 is provided at the lower end of the central plate 46 and is adapted to engage with the screw-threaded neck 34 of the plug 31. A vertically-extending opening 49 connects the socket 48 with the central opening 47 of the plate 46; the extension 38 of the metering float 36 being adapted to pass through the openings 39 and 49 and into the opening 47.

A plurality of internally screw-threaded bolt openings 50 are provided within the plate 46 adjacent the edges thereof; the bolt openings 50 being in alignment with the openings 45 in the outer plates 41 and 42.

A pair of identical heavy glass windows 51 are provided intermediate the central plate 46 and the outer plates 41 and 42; gaskets 52 providing fluid-tight seals intermediate the windows 51 and the plates 41 and 42 and 46.

A plurality of screw-threaded bolts 53 are adapted to pass through the openings 45 in the outer plates 41 and 42 and to engage within the screw-threaded openings 50 in the central plate 46.

It can be seen that tightening of the bolts 53 will lock the plates 41 and 42 and 46 into a more or less unitary unit and that the central opening 47 of the plate 46 will provide a fluid-tight chamber which is in communication with the pipe-line and within which the position of the upper end of the extension 38 of the metering float 36 can be observed through the windows 51.

One (or both) of the windows 51 can be provided with calibrations as shown in Figure 1, against which the position of the upper end of the extension 38 can be read off. The calibrations may be applied by etching or any other suitable procedure. Instead of having the calibrations applied directly to the windows 51, the calibrations may be applied to a separate calibration scale (not shown).

In Figure 3, I have shown another embodiment of the present invention.

The embodiment of Figure 3 is provided with a metering tube 54 which has a downwardly-tapered inner bore 55; an apertured spider 56 being provided at the lower end of the metering tube 54. The metering tube 54 is provided with an outwardly-extending flange 57 (similar to the flange 11 of the metering tube 10).

The embodiment of Figure 3 (instead of being connected to a horizontal inlet line as in the embodiment of Figure 1) is connected to a vertical inlet pipe-line 64 having a flange 65 at its upper end.

Since there is no need for the lower T 14 when connection is to be made to a lower vertical inlet pipe-line, the embodiment of Figure 3 employs merely an upper T 15 identical with that of Figure 1; the flange 57 being held in fluid-tight relationship intermediate the lower flange 17 of the T 15 and the upper flange 65 of the inlet pipe-line 64 by means of gaskets 18 and bolts 19.

The metering float 58 of Figure 3 generally resembles the float 36 of Figure 1 in the shape of its flow-constricting head portion 59. However, the body portion of the metering float 58, in addition to extending upwardly as at 60, also extends downwardly as at 61 from the head portion 59.

The upper extension 60 of the body portion is adapted to indicate the position of the float in the same manner as hereinabove described in connection with the embodiment of Figure 1. That is, the T 15 is provided with an upper visual extension (not shown) identical with that of Figures 1, 2 and 4. The lower extension 61 of the body portion of the float 58, extends downwardly through the apertured spider 56 and into the pipe-line 64 and serves to guide the float 58 within the tapered metering tube 54.

The position of the metering float 58 within the tapered inner bore 55 indicates the rate-of-flow of fluid in a manner well known in the art.

Another embodiment of the present invention is shown in Figure 5 as being connected to a pipeline in which the fluid moves vertically upward.

The lower and upper T's, which now have their side openings 20 and 21 facing in the same direction, are adapted to be connected to flanged lower and upper pipe-lines 64 and 66 by flanged L's 67 and 68 respectively.

The embodiment of Figure 5 employs a fluted metering tube 10 identical with that of Figure 1. However, (instead of being connected to the top of the upper T 15 as in the embodiment of Figure 1) the visual extension 35 is now inverted and connected to the lower flange 23 of the lower T 14; the cover plate 22 being used to close off the upper end of the upper T 15. The extension 35 is identical with that shown in Figures 1, 2 and 4 except that the calibrated windows 51 are turned around so that they still read upwardly. Where the calibrations are applied to a separate scale, the windows do not have to be changed, it being necessary only to turn the scale around.

The embodiment of Figure 5 includes a metering float 69 which has a downwardly-opening cone-shaped umbrella-type flow-constricting metering head 70, similar to those shown in Figures 1 and 3, and a body portion or extension 71 which extends downwardly from the head 70 and terminates within the extension 35; the position of the lower end of the extension 71 within the windows 51 of said extension 35 indicating the position of the metering head 70 with'n the metering tube 10 and being an indication of the rate-of-flow of the fluid.

It is apparent that the embodiment of Figure 5 can be modified by eliminating one or both of the L's 67 and 68 and by connecting one or both of the openings 20 and 21 to horizontal pipe-lines.

It is also obvious that the embodiment of Figure 5 can be modified by eliminating the upper T 15 and by connecting the vertical outlet line 66 directly to the upper flange of the lower T 14 in a manner analogous to that of Figure 3.

Still another embodiment of the present invention is shown in Figures 6 and 7 and includes a metering tube insert 72 which has a cylindrical fluted inner bore like that of the tube 10 but which has an annular outwardly-extending flange 73 formed at the upper end of the tube. In this way the metering tube insert 72 can be disposed wholly within the lower of two adjoining flanged pipe elements, as for example the lower T 14 of Figure 6. Thus, the upper pipe element may be a curved element, as for example the upper L 74 of Figure 6 which could not be used with tube insert such as the insert 10 in which the flange is intermediate the ends of the insert. The metering float 69 and extension 35 of Figure 6 are identical with the corresponding parts previously described in connection with the embodiment of Figure 5.

A further embodiment of the present invention is shown in Figure 8 and includes a metering tube insert 75 which has a cylindrical fluted inner bore like that of the tubes 10 and 72 but which has an annular outwardly-extending flange 76 formed at the lower end of the tube to permit the tube to be installed wholly within the upper of two adjoining flanged pipe elements, as for example the upper T 15, so that the lower element may be curved, as for example the lower L 77. The metering float 36 and the extension 35 of Figure 8 are identical with the corresponding parts of the embodiment of Figure 1.

The present invention contemplates the use of other piping arrangements in addition to the illustrative arrangements described herein, and also contemplates other forms of metering tube inserts and of metering floats. As used in the appended claims, the expression "pipe elements" includes T's, L's, straight sections, crosses and all other standard elements.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what I claim as new and desire to protect by Letters Patent, is:

1. For measuring the rate-of-flow of a fluid, a vertically extending elongated metering tube having vertically-varying cross-sectional area available for fluid-flow, said metering tube having an annular outwardly extending flange, upper and lower standard flanged pipe T's defining a generally vertical conduit and adapted for connection to a pipe-line or the like; means connecting said pipe T's and said metering tube in fluid-tight relationship with the flange of said metering tube intermediate and in abutting relationship with the flanges of said pipe T's a metering float having a generally conical flow-constricting head adapted for free up-and-down movement within said metering tube, and means permitting reading of the position of said metering float.

2. For measuring the rate-of-flow of a fluid, a pair of standard flanged pipe elements adapted for vertical flow of fluid therethrough, a flanged metering tube disposed vertically within said pipe elements, the flange of said metering tube being connected in fluid-tight relationship intermediate the adjoining flanges of said pipe elements, said metering tube having vertically varying cross-sectional area available for fluid-flow, a metering float having a flow-constricting head adapted for free up and down movement within said metering tube and having an elongated rod extending upwardly from said metering head, and means connected to the upper of said pipe elements permitting reading of the position of said elongated rod.

3. For measuring the rate-of-flow of a fluid, a pair of standard flanged pipe elements adapted for vertical flow of fluid therethrough, a flanged metering tube disposed vertically within said pipe elements, the flange of said metering tube being connected in fluid-tight relationship intermediate the adjoining flanges of said pipe elements, said metering tube having upwardly increasing cross-sectional area available for fluid-flow, a metering float having a flow-constricting head adapted for free up-and-down movement within said metering tube and having an elongated rod extending downwardly from said metering head, and means connected to the lower of said pipe elements permitting reading of the position of said elongated rod.

4. For measuring the rate-of-flow of a fluid, a pair of standard flanged pipe elements adapted for vertical flow of fluid therethrough, a flanged metering tube disposed vertically within said pipe elements, the flange of said metering tube being connected in fluid-tight relationship intermediate the adjoining flanges of said pipe elements, said metering tube having vertically-varying cross-sectional area available for fluid-flow, a metering float having a flow-consticting head adapted for free up-and-down movement within said metering tube and having an elongated rod extending vertically from said metering head, and means connected to one of said pipe elements permitting reading of the position of said elongated rod.

5. For measuring the rate-of-flow of a fluid, a pair of vertically disposed standard pipe T's having horizontally extending openings for connection to a pipe-line or the like, a metering tube vertically disposed within said pipe T's, said metering tube having an outwardly extending annular flange connected in fluid-tight sealing relationship with the adjoining flanges of said pipe T's, said metering tube having vertically varying cross-sectional area available for fluid flow, a metering float having a flow-constricting head adapted for free up-and-down movement within said metering tube and having a elongated vertical extension rod, and means connected to the end of one of said pipe T's for permitting reading of the position of said extension rod.

6. For measuring the rate-of-flow of a fluid, a metering tube of vertically-varying cross-sectional area available for fluid-flow, said metering tube having an annular outwardly extending flange, upper and lower standard flanged pipe elements providing a generally vertical conduit, said metering tube being vertically disposed within at least one of said pipe elements, the flange of said metering tube being immovably connected in fluid-tight relationship intermediate and in abutting relationship with the flanges of said pipe elements, a metering float having a flow-constricting head adapted for free up-and-down movement within said metering tube, and means permitting reading of the position of said metering float.

7. For measuring the rate-of-flow of a fluid, a pair of standard flanged pipe elements adapted for vertical flow of fluid therethrough, a flanged metering tube disposed vertically within one of said pipe elements, the flange of said metering tube being connected in fluid-tight relationship intermediate the adjoining flanges of said pipe elements, said metering tube having vertically-varying cross-sectional area available for fluid-flow, a metering float having a flow-constricting head adapted for free up-and-down movement within said metering tube and having an elongated rod extending vertically from said metering head, and means connected to one of said pipe elements permitting reading of the position of said elongated rod.

8. For measuring the rate-of-flow of a fluid, a pair of standard flanged pipe elements adapted for vertical flow of fluid therethrough, a flanged metering tube disposed vertically within only one of said pipe elements, the flange of said metering tube being connected in fluid-tight relationship intermediate the adjoining flanges of said pipe elements, said metering tube having vertically-varying cross-sectional area available for fluid-flow, a metering float having a flow-constricting head adapted for free up-and-down movement within said metering tube and having an elongated rod extending vertically from said metering head, and means connected to the pipe element containing said metering tube permitting reading of the position of said elongated rod.

9. For measuring the rate-of-flow of a fluid, a pair of standard flanged pipe elements adapted for vertical flow of fluid therethrough, a flanged metering tube disposed vertically within only the upper of said pipe elements, the flange of said metering tube being connected in fluid-tight relationship intermediate the adjoining flanges of said pipe elements, said metering tube having vertically varying cross-sectional area available for fluid-flow, a metering float having a flow-constricting head adapted for free up-and-down movement within said metering tube and having an elongated rod extending upwardly from said metering head, and means connected to the upper of said pipe elements permitting reading of the position of said elongated rod.

10. For measuring the rate-of-flow of a fluid, a pair of standard flanged pipe elements adapted for vertical flow of fluid therethrough, a flanged metering tube disposed vertically within only the lower of said pipe elements, the flange of said metering tube being connected in fluid-tight relationship intermediate the adjoining flanges of said pipe elements, said metering tube having upwardly increasing cross-sectional area available for fluid-flow, a metering float having a flow-constricting head adapted for free up-and-down movement within said metering tube and having an elongated rod extending downwardly from said metering head, and means connected to the lower of said pipe elements permitting reading of the position of said elongated rod.

11. For measuring the rate-of-flow of a fluid, a downwardly tapered metering tube having an annular outwardly-extending flange, upper and lower standard flanged pipe elements providing a generally vertical conduit, said metering tube being vertically disposed within at least one of said pipe elements, the flange of said metering tube being disposed in fluid-tight relationship intermediate the adjoining flanges of said pipe elements and being immovably connected to each of said adjoining flanges by bolts passing through all three flanges, a metering float having a flow-constricting head adapted for free up-and-down movement within said metering tube, said float having a specific gravity somewhat greater than that of said fluid, and means permitting reading of the position of said metering float.

12. For measuring the rate-of-flow of a fluid, a fluted metering tube having an annular outwardly-extending flange, upper and lower standard flanged pipe elements providing a generally vertical conduit, said metering tube being vertically disposed within at least one of said pipe elements, the flange of said metering tube being disposed in fluid-tight relationship intermediate the adjoining flanges of said pipe elements and being immovably connected to each of said adjoining flanges, a metering float having a flow-constricting head adapted for free up-and-down movement within said metering tube, and means permitting reading of the position of said metering float.

13. For measuring the rate-of-flow of a fluid, a pair of standard flanged pipe elements adapted for vertical flow of fluid therethrough, a flanged rotameter tube insert disposed vertically within at least one of said pipe elements, the flange of said metering tube being connected in fluid-tight relationship intermediate the adjoining flanges of said pipe elements, a metering float having a flow-constricting head adapted for free-up-and-down movement within said tube insert, the position of said flow-constricting head within said tube insert being a measure of the rate-of-flow of said fluid, and means permitting reading of the position of said flow-constricting head, said means including an elongated vertical extension rod forming part of said metering float, and means connected to one of said pipe elements for permitting reading of the position of said extension rod.

14. For measuring the rate-of-flow of a fluid, a pair of standard flanged pipe elements adapted for vertical flow of fluid therethrough, a flanged rotameter tube insert disposed vertically within at least one of said pipe elements, the flange of said metering tube being connected in fluid-tight relationship intermediate and in abutting relationship with the adjoining flanges of said pipe elements, a metering float having a thin annular flow-constricting head adapted for free-up-and-down movement within said tube insert, the position of said flow-constricting head within said tube insert being a measure of the rate-of-flow of said fluid, and means permitting reading of the positon of said flow-constricting head, said means including an elongated vertical rod extending from said float beyond one of said pipe elements.

15. For measuring the rate-of-flow of a fluid, a pair of standard flanged pipe elements adapted for vertical flow of fluid therethrough, said elements providing a generally vertical conduit for said fluid, a flanged rotameter tube insert disposed vertically within at least one of said pipe elements, the flange of said tube being disposed intermediate the adjoining flanges of said pipe elements, a plurality of bolts through said tube flange and said adjoining pipe element flanges and interconnecting them in immovable fluid-tight relationship, a metering float having a flow-constricting head adapted for free-up-and-down movement within said tube insert, the position of said flow-constricting head within said tube insert being a measure of the rate-of-flow of said fluid, and means permitting reading of the position of said flow-constricting head.

NATHANIEL BREWER.